United States Patent [19]

Kreitzer

[11] Patent Number: 5,253,349

[45] Date of Patent: Oct. 12, 1993

[54] DECREASING PROCESSING TIME FOR TYPE 1 DYADIC INSTRUCTIONS

[75] Inventor: Stuart S. Kreitzer, Boca Raton, Fla.

[73] Assignee: International Business Machines Corporation, Armonk, N.Y.

[21] Appl. No.: 647,966

[22] Filed: Jan. 30, 1991

[51] Int. Cl.$^5$ .............. G06F 7/02; G06F 9/30; G06F 9/22; G06F 9/34

[52] U.S. Cl. .............. 395/375; 364/230.5; 364/239; 364/239.9; 364/242.1; 364/245.9; 364/247.2; 364/247.6; 364/246.9; 364/247.3; 364/246.92; 364/251.4; 364/255.1; 364/258; 364/258.4; 364/259; 364/259.2; 364/259.9; 364/261.3; 364/261.4; 364/261.5; 364/262.4; 364/262.7; 364/262.8; 364/262.9; 364/263.2; 364/263.3; 364/DIG. 1; 364/DIG. 2

[58] Field of Search .............. 395/800, 375, 425, 400, 395/500, 775, 700, 250, 275, 725, 550, 200; 364/DIG. 1, DIG. 2

[56] References Cited

U.S. PATENT DOCUMENTS

| | | | |
|---|---|---|---|
| 3,659,089 | 4/1972 | Payne et al. | 364/738 |
| 3,699,323 | 10/1972 | Reinheimer | 364/738 |
| 3,816,728 | 6/1974 | Chen et al. | 364/739 |
| 4,228,498 | 10/1980 | Moshier | 395/325 |
| 4,229,801 | 10/1980 | Whipple | 423/228 |
| 4,258,419 | 3/1981 | Blahut | 395/375 |
| 4,314,350 | 2/1982 | Toy | 364/740 |
| 4,346,437 | 8/1982 | Blahut | 395/375 |
| 4,760,520 | 7/1988 | Shintani et al. | 395/375 |
| 4,789,956 | 12/1988 | Hildebrandt | 364/736.5 |
| 4,870,607 | 9/1989 | Ishizuka | 364/739 |
| 4,890,253 | 12/1989 | Jabusch et al. | 364/736.5 |
| 4,899,303 | 2/1990 | Kimura | 364/739 |
| 4,916,696 | 4/1990 | Funakubo | 371/11.3 |
| 4,926,374 | 5/1990 | Schaffer | 364/739 |
| 4,926,476 | 5/1990 | Covey | 364/222.5 |
| 4,977,534 | 12/1990 | Takahashi | 364/748 |
| 5,016,208 | 5/1991 | Horst et al. | 364/740 |

Primary Examiner—Robert B. Harrell
Assistant Examiner—Daniel H. Pan
Attorney, Agent, or Firm—W. J. Brown; R. Lieber

[57] ABSTRACT

In a data processing system, including a memory subsystem and a CPU subsystem coupled to the memory subsystem for processing program instructions stored in the latter, the present disclosure describes an arrangement for improving the handling of type 1 dyadic instructions in the CPU subsystem. Type 1 dyadic instructions generally involve the logical processing of two operands in the CPU, and the writing of an associated result function to a designated location in memory at which one of the two operands originated. In accordance with the present invention, the result is compared with the origin operand at an appropriate instant in the instruction execution sequence and the writing operation is conditioned on this comparison. If the compared values are different the writing operation is allowed to continue, but if the compared values are equal the writing operation is skipped; thereby eliminating CPU and memory operating cycles otherwise required for completing the writing action.

6 Claims, 2 Drawing Sheets

DECREASING PROCESSING TIME FOR TYPE 1 DYADIC INSTRUCTIONS

FIELD OF THE INVENTION

This invention relates to logical implementation of two-operand computer instructions.

BACKGROUND OF THE INVENTION

Computer instructions which involve performance of an operation on a pair of operands are presently termed "dyadic" type instructions. The operands may originate from computer memory, registers or the instruction itself. A dyadic instruction which calls for writing the operation result into memory, at a memory location at which one of the instruction operands originated, is presently designated "type 1 dyadic".

The present invention involves recognition that the memory writing operation of a type 1 dyadic instruction is unnecessary when the execution result does not differ from the operand originally fetched from the memory location designated to be written, and that processing efficiency could be improved by eliminating the writing action in such circumstances.

OBJECTS OF THE INVENTION

An object of the present invention is to provide a method and associated circuitry for improving processing efficiency in computer systems by modifying the processing architecture associated with execution of type 1 dyadic instructions.

An associated object is to provide a method and associated circuitry for instantaneously comparing a result obtained from executing a type 1 dyadic instruction with the operand which originated at the memory location to which the result is to be written, and for eliminating the memory writing operation when the compared values are equal; thereby shortening execution times of such instructions and improving overall processing efficiency.

SUMMARY OF THE INVENTION

The above objects are realized by incorporating a hardware comparator circuit in computer central processing units (CPU's) in which type 1 dyadic instructions are executed, and conditioning execution of memory write operations associated with such instructions on a state of the comparator output at a predetermined instant in the instruction execution sequence. Inputs to the comparator represent an operand originating from the memory location to be written and a result formed by executing the instruction. Thus, the output of the comparator at the above-mentioned instant is an immediate indication of whether or not the result is identical to what is already stored at the location scheduled to be written. If the result differs from what is currently stored, the writing operation is allowed, but if the result is the same that operation is skipped. This effectively reduces the cycle time consumed by the processing of such instructions and thereby improves the efficiency of operation of the respective CPU accordingly.

The foregoing and other, objects, effects, advantages and benefits may be more fully understood and appreciated by considering the following Description and claims.

DETAILED DESCRIPTION OF THE INVENTION

Figure 1:
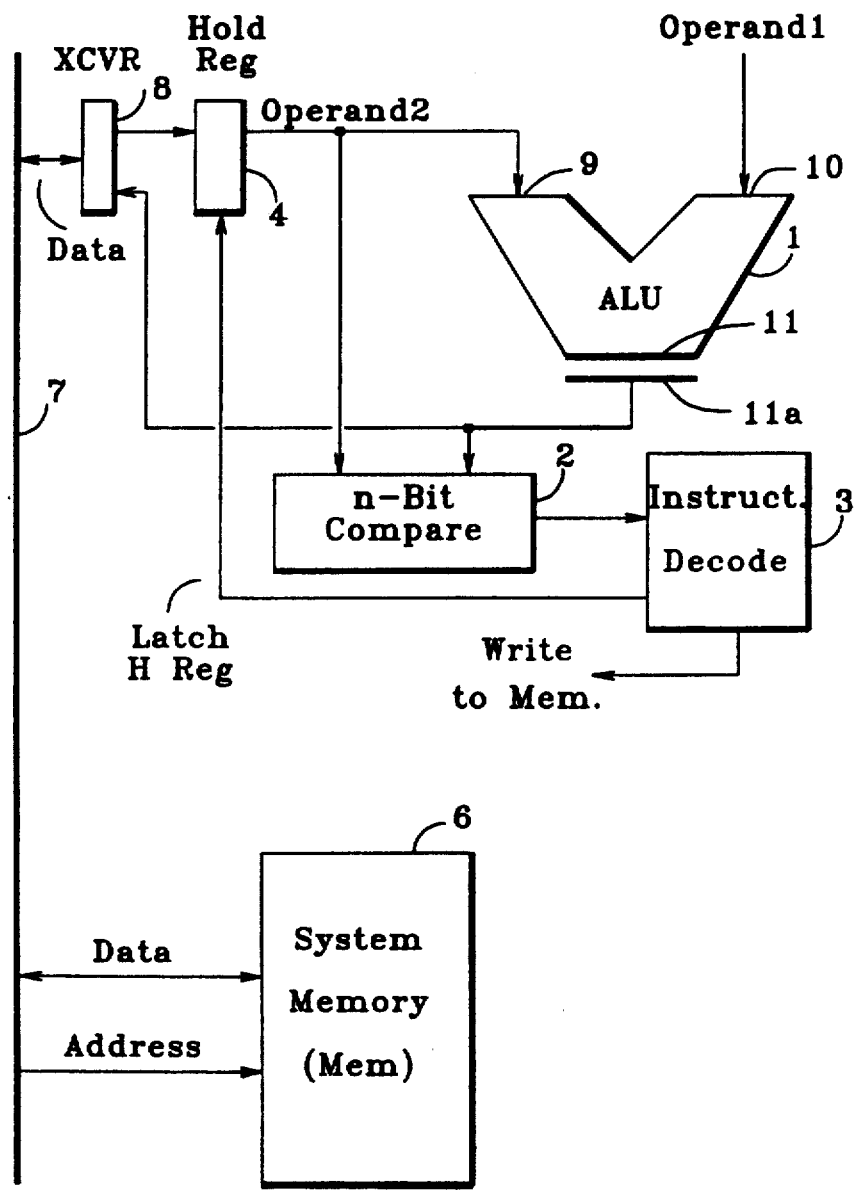
FIG. 1 is a simplified block diagram of a computer system CPU configured in accordance with the present invention.

Referring to FIG. 1, a typical computer system CPU in accordance with the present invention comprises logic circuitry 1, compare circuitry 2, instruction decode (sequence control) logic 3, and a number of registers, one of which is shown at 4. The system containing the CPU as generally designated as 1-4 comprises memory facilities 6 such as cache, RAM, disk drives, etc., a system bus 7 and transceiver circuitry 8. Bus 7 and transceiver circuits 8 operate to transfer information signals bidirectionally between the CPU and memory facilities. It is understood that all of the foregoing operate cyclically under control of clocking or timing signals which are well known in the art and are not shown for clarity.

In the system arrangement to be described, register 4 is a "Hold Register" receiving data operands from memory 6 via bus 7 and transceiver circuitry 8. During execution of program instructions, data operands are latched into register 4 in response to signals "Latch H Reg." issued by instruction decoder 3. In respect to the presently contemplated execution of type 1 dyadic instructions, an operation is performed on two operands, one of which is positioned register 4, and the result of that operation is conditionally written to memory depending on a comparison operation to be described.

Logic circuitry 1, a principal component of which would be an arithmetic logic unit or ALU as suggested in the drawing, comprises inputs 9 and 10 and output 11. Input signals presented at one or both of the inputs 9, 10, at an early phase of a clocking cycle, are processed by the circuitry 1 to produce signals at output 11, at a later phase of the same cycle, which represent results of such processing. Signals at 11 may be latched briefly in latches suggested at 11a.

Instruction decoder 3 may comprise discrete logic circuits, a gate array or a microprogram stored in a memory, as is well known in the art. In a manner well known in the art, signals representing program instructions are fetched from memory facilities 6, stored in CPU registers, applied to decoder 3 (through paths not shown in the figure), and interpreted by the latter to produce control signals directing operations of the system. In such operations, operand signals held in CPU registers are applied to "ALU" inputs 9 and 10, and associated result signals produced at ALU output 11 are transferred either to a CPU register or to memory via transceiver circuits 8 and bus 7. Generally, the signals applied to the ALU inputs are transferred from CPU registers in parallel form, n bits at a time (n typically 8, 16 or 32), and associated result signals are produced in parallel form and transferred to registers or the bus n bits at a time.

Inputs of compare circuits 2 connect to outputs of the ALU (11, 11a) and at least one CPU register such as 4. The output of the compare circuits is connected to instruction decoder circuits 3 for determining processing sequences of type 1 dyadic instructions in accordance with the present invention. The compare circuits compare correspondingly ordered bits of operand and result signals received at its inputs, and provide an output indicating if all of the compared bits are or are not identical.

Figure 2:
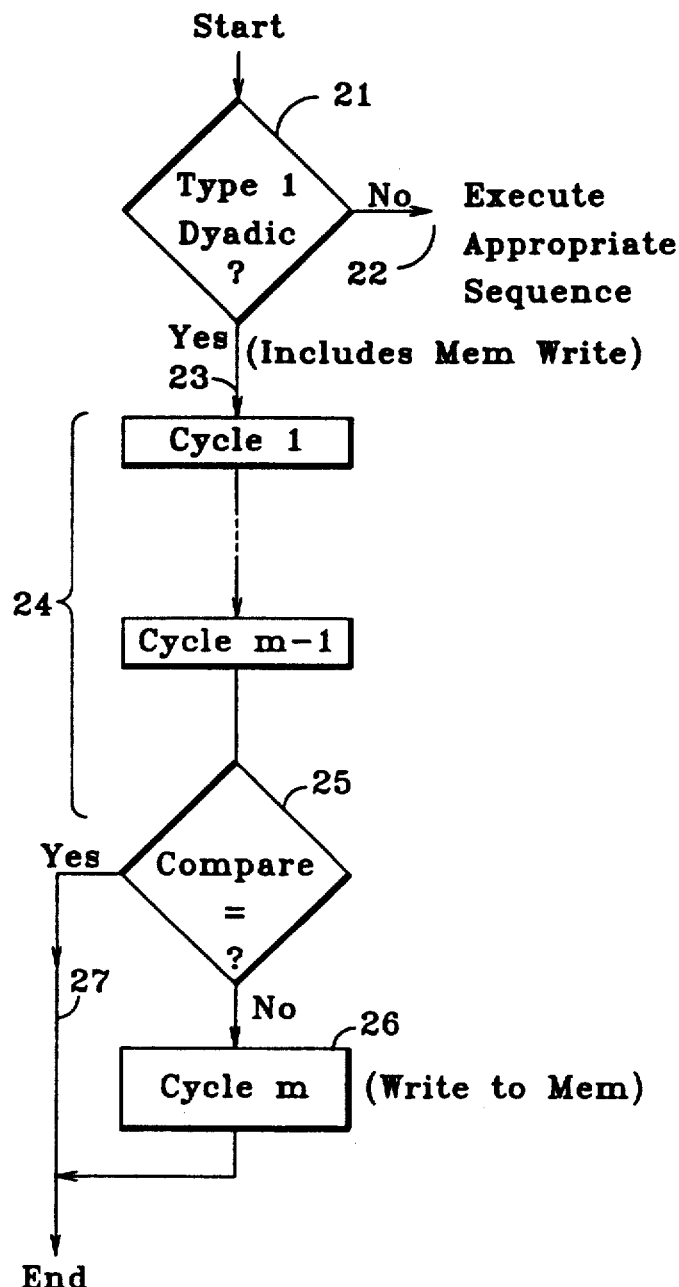
FIG. 2 is a flow diagram, exemplifying the sequence control logic of the CPU shown in FIG. 1 in respect to the operations associated with processing type 1 dyadic instructions in accordance with the present invention.

When the instruction being decoded is type 1 dyadic, and the output of compare circuits 2 indicates that the compared result and source operand are not identical, the memory writing operation for storing the result at the location representing the origin of the compared operand is allowed to continue. When the instruction is type 1 dyadic and the compare circuits indicate a match, the memory writing action is skipped. This process is indicated by the flow diagram of FIG. 2, and described next with reference to FIGS. 1 and 2.

At 21, the decoder distinguishes the type of instruction being processed and selects between conventional (prior art) operating sequences for instructions other than type 1 dyadic and operating sequences for type 1 dyadic instructions. If the instruction currently being processed is other than type 1 dyadic, the sequence path entered at 22 is of no relevance to the present invention. If the instruction currently being processed is type 1 dyadic, the sequence path entered at 23 comprises a series of m-1 cyclic operations 24 (m is an arbitrary integer) which prepare the two associated operands of the instruction. One operand (operand 1, which may be an immediate portion of the instruction or data fetched from a source location in memory) is placed in a not-shown CPU register, and the other operand (operand 2, fetched from a destination address location in memory) is placed in register 4. In the "m-1"st cycle, the signals representing the associated operands are applied to the inputs of ALU 1, and signals representing a logical result are produced shortly thereafter at the ALU output. The signals representing operand 2 and the ALU output are also compared bit-for-bit by circuits 2, and the output of the latter circuit conditions decoder 3 to select one of two continuing sequence actions as indicated at 25.

If the comparison output indicates that operand 2 and the ALU output do not match, the sequence continues to one (or more) additional cycles m shown at 26, during which the ALU output is transferred to bus 7 and written to the destination address location in memory as is conventional in prior art handling of type 1 dyadic instructions. However, if the compare circuits indicate a match at decision instant 25, the sequence takes "short" path 27, skipping/bypassing step(s) 26. If no other action is required after operation(s) 26, execution of the respective instruction may be ended immediately at the instant or cycle in which the match condition is sensed.

I claim:

1. In a data processing system including processing and memory subsystems, said processing subsystem containing instruction decode logic and operand processing logic, said operand processing logic performing operations defined by program instructions stored in said memory subsystem and interpreted by said instructions decode logic, said instructions including type 1 dyadic instructions designating performance of logical operations on pairs of first and second information operands stored in said memory subsystem, and writing into a destination address location in the memory subsystem of information representing results of respective said logical operations, wherein each said destination location corresponds to a memory location from which one of said operands of each said pair of operands is retrieved prior to a respective said logical operation, an enhanced processing subsystem comprising:

comparison circuit means for producing a comparison result indicating signal by comparing operand and result information handled during execution of each said type 1 dyadic instruction, said result indicating signal being set to states denoting equality and inequality when said compared operand and result are respectively equal and unequal, each said compared operand being retrieved from a memory location that is defined in the respective said type 1 dyadic instruction as a memory destination location into which the respectively compared result should be written; and means responsive to each said comparison result indicating signal for conditioning said instruction decode logic to selectively skip a memory writing operation pre-defined by the respective type 1 dyadic instruction then being decoded when the respective comparison result indication is set to indicate equality, each said memory writing operation designating writing of a respectively compared said result at a respective said destination location.

2. An enhanced processing subsystem according to claim 1, containing a holding register, which during execution of each said dyadic instruction receives and holds said operand to be compared by said comparison circuit means to respective said result information, each said received operand and respective result constituting an n-bit parallel unit of information; and further wherein:

said comparison circuit means comprises circuitry for comparing individual bits of said operand received in said holding register with correspondingly positioned bits of a respective said comparison result, said circuitry operating to produce a said comparison result indication denoting equality if and only if all compared bits of said received operans and result are equal.

3. An enhanced processing subsystem according to claim 2 wherein said instruction decode and operand processing logic operate in predetermined clock cycles, and at least one complete one of said clock cycles is required for writing the result produced by decoding each said dyadic type 1 instruction at a respective said destination location in said memory subsystem; and wherein:

an effect realized when said instruction decode logic is conditioned to skip said result writing operation is to reduce the number of clock cycles taken to execute the respective dyadic type 1 instruction by at least one clock cycle.

4. In a data processing system including memory and logical processing subsystems, said logical processing subsystem containing instruction decode logic for interpreting instructions stored in said memory subsystem and operand processing logic for performing operations defined by said instructions on operands designated by said instructions, said instructions including type 1 dyadic instructions each of which calls for logical processing of a pair of source information operands, including a source operand retrieved from a predetermined first location in said memory subsystem, and for producing result information, and storage of a result operand yielded by said logical processing of said pair of source operands at the respective said first location in said memory subsystem, an enhanced method for processing said type 1 dyadic instructions comprising:

at a predetermined stage of execution of each said type 1 dyadic instruction, comparing the result operand produced by said execution with the respective said source operand retrieved from the respective first location; and conditionally proceeding with operations to write the result operand into said respective first memory location only when the compared values differ, and otherwise skipping said result writing operations with the effect of shortening the time taken to execute the respective type 1 dyadic instructions.

5. An enhanced method of executing type 1 dyadic instructions in accordance with claim 4, wherein said source operand of each said dyadic type 1 instruction that is retrieved from said respective first location is stored in a predetermined register of said processing subsystem in an n-bit parallel form, wherein the source operands processed by said instruction are processed in an n-bit parallel form, wherein signals representing said result operand are produced in an n-bit parallel form, and wherein further:

said comparing step is carried out by comparing bits in said source operand retrieved from said respective first location with correspondingly positioned bits in said respective result operand, and then generating a signal denoting that the respectively compared source and result operands are either equal or unequal, said signal denoting that the compared operands are equal being generated if and only if all respectively compared bits are equal, and said signal denoting that the compared operands are unequal being generated when any of the respectively compared bits are unequal.

6. The method of executing type 1 dyadic instructions in accordance with claim 5, wherein said logical processing subsystem operates in predetermined clock cycles and at least one complete cycle is required to carry out actions for storing said result signal; and wherein:

said instruction execution sequence is at least one clock cycle longer when said compared source operand and result differ than when they are the same.

* * * * *